United States Patent
Parkinson

(12) 
(10) Patent No.: US 6,299,817 B1
(45) Date of Patent: *Oct. 9, 2001

(54) METHOD FOR SEAMLESS CONSTRUCTION OF MOLDED ELASTOMER PRODUCTS

(76) Inventor: Kevin G. Parkinson, 1903 - 121 10th Street, New Westminster, B.C. (CA), V3M 3X7

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,334

(22) Filed: Dec. 30, 1997

Related U.S. Application Data

(63) Continuation-in-part of application No. 08/706,444, filed on Aug. 30, 1996, now abandoned, which is a continuation of application No. 08/367,673, filed on Dec. 30, 1994, now abandoned, which is a continuation of application No. 08/222,331, filed on Apr. 4, 1994, now abandoned, which is a continuation of application No. 07/878,199, filed on May 4, 1992, now abandoned, which is a continuation-in-part of application No. 07/667,882, filed on Mar. 12, 1991, now abandoned, which is a continuation-in-part of application No. 07/598,156, filed on Oct. 16, 1990, now abandoned.

(51) Int. Cl.[7] .............................. B29C 33/38; B29C 33/06
(52) U.S. Cl. .................... 264/402; 264/219; 264/245; 264/246; 264/255; 264/301; 264/306; 264/347; 264/236; 264/402; 425/275; 425/112; 425/174.4; 249/115; 12/142 E
(58) Field of Search ................................ 264/219, 245, 264/246, 301, 306, 347, 236, 402, 4, 255; 36/8.1, 98, 102; 425/275, 112, 174.4; 249/115

(56) References Cited

U.S. PATENT DOCUMENTS

| 2,880,467 | * | 4/1959 | Wibbens | 264/255 |
| 3,079,644 | * | 3/1963 | Molitor et al. | 264/255 |
| 3,536,290 | * | 10/1970 | Terry | 249/103 |
| 3,906,071 | * | 9/1975 | Cook et al. | 264/255 |
| 4,589,940 | | 5/1986 | Johnson . | |
| 5,059,362 | * | 10/1991 | Tsuchihashi | 264/25 |
| 5,128,088 | * | 7/1992 | Shimomura et al. | 264/305 |
| 5,728,340 | * | 3/1998 | Dreibelbis et al. | 264/216 |

* cited by examiner

Primary Examiner—Jan H. Silbaugh
Assistant Examiner—Suzanne E. McDowell
(74) Attorney, Agent, or Firm—Todd N. Hathaway

(57) ABSTRACT

A process which allows elastomeric materials of different colors, durometers and/or other material characteristics to chemically bond to one another so as to eliminate any possibility of delamination. Latex-based liquid elastomer solutions having different material characteristics are applied sequentially to a heated mold to form a series of layers making up the article, with rapid partial curing taking place between each application; the partial curing forms a skin coat over each layer which prevents intermixing of the different solutions, but which still permits a chemical bond to form during full curing of the materials. The process applies equally to dip (immersion) molded and flat molded goods. An example of the invention as it relates to flat-molded goods is an athletic shoe sole, and an example as it relates to dip-molded goods is a resilient, one piece watersports boot which can be fitted over a human foot without a zipper.

19 Claims, 5 Drawing Sheets

METHOD FOR SEAMLESS CONSTRUCTION OF MOLDED ELASTOMER PRODUCTS

RELATED CASES

This application is a continuation-in-part application of U.S. Ser. No. 08/706,444, filed Aug. 30, 1996, entitled "Seamless Waterproof Article", now abandoned, which is a continuation application of U.S. Ser. No. 08/367,673, filed Dec. 30, 1994, now abandoned, which is a continuation of U.S. Ser. No. 08/222,331, filed Apr. 4, 1994, now abandoned, which is a continuation of Ser. No. 07/878,199, filed May 4, 1992, now abandoned, which is a continuation-in-part of U.S. Ser. No. 07/667,882, filed Mar. 12, 1991, now abandoned, which is a continuation-in-part of U.S. Ser. No. 07/598,156, filed Oct. 16, 1990, now abandoned, all entitled "Seamless Waterproof Article".

FIELD OF THE INVENTION

The present invention relates generally to processes for the manufacture of molded elastomeric products, and, more particularly, to a process for the manufacture of a elastomeric product in which there are a plurality of layers having different characteristics, such as different colors and/or durometers, which are bonded together chemically as a result of the molding process so as to obviate any possible delamination of the layers.

BACKGROUND OF THE INVENTION

The present invention is directed principally to flat-molded and form-molded (e.g., dip-molded) elastomeric products, formed by the curing of fluid elastomer materials, in which for reasons of functionality and/or aesthetics it is important that different portions, areas, sections or layers of the product be formed of elastomeric materials having different durometers, colors, and/or other material characteristics.

Notable examples of flat-molded products of this type include shoe soles, in which it is desirable to have certain areas with higher durometers for durability and others with lower durometers for cushioning, and logos on athletic clothing, in which it is important that different areas of the article be formed in distinct, often bright colors. Examples of form-molded products, in turn, include gloves and boots, in which again it is often important for certain areas of the product to be formed of materials having different durometers, colors, or other characteristics so as to enhance the function or appearance of the article; for example, it may be advantageous for one section of a glove or boot to be very elastic and pliable while another section is more rigid and puncture-resistant, while yet another section may be specifically configured for traction or cushioning.

In conventional practice, such articles have usually been manufactured using injection molding or compression molding processes. Conventional injection molding processes are capable of using only one color/durometer of material at a time: in products where two or more colors are required, these must be silk-screened or otherwise painted/coated onto the surface of the injection molded part and thus tend to wear off quickly in use. Multi-durometer and multi-color parts can also be created through a compression molding process, which requires that each part of a specific color or durometer be molded separately and then assembled using adhesives and pressure, but this is a very labor-intensive and expensive technique and the pieces often tend to delaminate or otherwise come apart in use.

Another common problem with injection and compression molding is the extreme cost which is inherent in making the molds which are required for these processes (e.g., a production mold can easily cost $50,000 U.S. or more), which makes, for example, seasonal style changes prohibitively expensive. Furthermore, since the materials which are traditionally used in these products and processes are relatively non-elastic in nature, multiple molds are required for different sizes of each product; for example, in the case of shoe soles, separate, specific molds are required for each size and width of foot.

In addition to the problems which have been discussed above, yet another difficulty often develops in the case of close-fitting molded elastomeric products, for example, the waterproof boots and gloves which are widely used in athletic/sports activities such as scuba diving, snow/water skiing, surfing/windsurfing, and so on. Waterproof boots and gloves of this kind are conventionally constructed of shaped rubber-cloth pieces which are sewn together, with the seams then being coated with rubber/sealant to waterproof them. Not only is this process inefficient and labor-intensive, it is very common for the seams to stretch during use, so that the article develops leaks and becomes water logged. As a result, such boots/gloves tend to fill and expand with water (especially under hard use), so that they do not conform properly to the wearer's foot/hand; as a stop-gap measure, such articles are often fitted with zippers (which may create yet another source of leaks) in an effort to allow the boot or glove to be donned/removed while remaining tightly contoured to the ankle or wrist. Also, the seams and zipper can be quite uncomfortable and abrasive to the user's foot.

A one-piece boot, glove or other molded article which incorporates multiple characteristics (e.g., different durometers and/or colors) in different sections or areas, but without requiring the use of adhesives or seams, would solve these problems. Prior art attempts at providing a solution along these lines have not been feasible, however, at least from a commercial standpoint. For example, the following three U.S. patents disclose various waterproof, resilient articles which are adapted to fit various parts of a human body, but the processes which are taught therein are not entirely satisfactory for use in connection with the types of products which have been described above.

For example, U.S. Pat. No. 2,666,208 (Funk) discloses a process for manufacture of prosthetic stockings. The stockings are formed of a sheer fabric base which is coated on one side with alternate layers of rubber-like and filler materials to render the stocking opaque. Funk does not, however, disclose any commercially feasible batch or continuous process for which is capable of forming a seamless elastomeric product having different material characteristics (e.g., different colors or durometers) in various areas or sections.

U.S. Pat. No. 3,633,216 (Schonboltz) discloses a rubber surgical glove which is formed of a relatively thin material so as to provide maximum tactile agility and ease of manipulation. The glove has at least one finger portion which is made with a double thickness to prevent punctures and the passage of contamination therethrough. Schonboltz does not disclose any process for bonding elastomers having different colors, durometers, or other characteristics.

U.S. Pat. No. 4,133,624 (Heavner et al.) discloses a molded glove having hand and wrist portions. The wrist portion includes a plurality of longitudinal channels around the circumference thereof, and also a plurality of circumferential channels at the end opposite the hand portion. The channels cross one another, and the thickness of the glove along the channels is greater than the thickness in adjacent areas; the purpose of the channels is to provide the cuff with improved resistance against rolling down while being worn, as compared with gloves which have only longitudinal flutes/channels or beaded cuffs. The reference does not disclose any process for bonding elastomers having different colors, durometers or other characteristics.

Other known prior art includes the following:

Canadian Patent No. 1,077,263 (Stockli) discloses a boot for aquatic activities. A cellular elastomeric sock is bonded to a non-cellular, in-situ vulcanized outsole which includes a toe portion, a heel portion and foxing. The sock may be covered with a fabric such as nylon. Bonding of the outsole may be aided by applying a first layer of neoprene cement, which penetrates and impregnates the fabric, and a second layer of a natural rubber cement. Vulcanizing of the outsole is carried out in a heated, pressurized environment. Stockli does not disclose any process in which elastomers having different colors, durometers or other characteristics are permanently bonded in the molding process itself.

French Patent No. 2,454,280 (Fritsch) discloses a beach shoe which is made by dipping a hollow mold into latex to produce an elastic, close-fitting shoe having variable wall thickness. Greater wall thicknesses at the sole and at the top, toe and heel areas are produced by using a mold having thicker walls those regions, so that the greater local heat capacity of the mold in these areas results in a greater build-up of gelled latex material. Fritsch does not disclose any process for bonding elastomers having different material characteristics.

SUMMARY OF THE INVENTION

The present invention has solved the problems cited above, and is a process for manufacture of multi-characteristic (typically multi-durometer and/or multi-color) seamless elastomeric article formed by immersion molding or flat molding. One example of an immersion molded article is an aqua boot formed by dipping a heated mold into a liquid solution of a resilient, curable elastomer, such as a polyvinyl chloride plastisol. An example of a flat-molded product, in turn, is an outer sole for an athletic shoe which is formed by dispensing such an elastomer solution into one or more cavities in a heated, open-topped mold.

The invention thus in one aspect pertains to a method for manufacture of a seamless, one-piece, elastomeric article, such as a boot, having multiple material characteristics (e.g., multi-durometer, multi-color, elastic/inelastic and/or foamed/non-foamed sections), by the sequential steps of (a) immersing a heated mold having a shape corresponding to the interior of the article into a heated solution of a latex-based elastomer having a first material characteristic, so that a layer of the first elastomer gels thereon, (b) withdrawing the mold which is coated with the layer of the first elastomer, (c) partial curing the layer of the first elastomer (e.g., by placing the elastomer-coated mold in an oven for a predetermined period of time), (d) immersing at least a portion of the mold in a heated solution of a second latex-based elastomer having a second material characteristic, so that a layer of the second elastomer gels on at least a portion of the layer of the first elastomer, (e) withdrawing the mold which is coated with the layers of the first and second elastomers, and (f) fully curing the layers of the first and second elastomers so that a permanent chemical bond forms at the interface of the two layers. The mold and coatings can be cured in an inverted position so as to prevent drip/runs from forming on the distal end of the article. Depending on the design of the article, one or more additional layers of elastomer material may be used.

The correct thickness and height of the article can be achieved by (a) immersing the mold in the first elastomer up to the full design height of the article, (b) permitting the layer of first elastomer to adhere to the mold to a predetermined thickness, (c) removing the mold and partially curing the first layer, (d) immersing the elastomer coated mold into the second elastomer solution up to a predetermined dip line which is at or below the full design height of the article, (e) permitting the layer of the second elastomer to adhere to the first layer to a predetermined thickness, which in combination with the thickness of the first layer gives that portion of the article a total thickness which is approximately equal to a design thickness, (f) withdrawing the mold from the second elastomer solution, and (g) fully curing the layers of first and second elastomer materials so that the permanent chemical bond is formed between the two.

A thick sole or base can be formed on the article by immersing the elastomer coated mold in a third elastomer solution before the first two layers of elastomers are fully cured. This third elastomer may be an open or closed cell material and also forms a chemical bond with one or both of the others. Alternatively, an outsole or other outer/bottom layer manufactured as a flat-molded product can be bonded to the article by laying this on the article before the elastomer coating on the mold is completely cured; the flat-molded layer will then chemically bond to the dip-molded layer when heated to an elevated temperature.

In one embodiment, the mold is heated to a temperature from about 300° to about 450° F. and is then immersed in the first elastomer solution for a period of time from about 1 second to about 180 seconds. The mold and first elastomer layer are then placed in an oven with an air temperature in the range from about 190° to about 700° F. for a period of time from about 10 seconds to about 5 minutes, prior to immersing the mold and first elastomer coating in the second elastomer solution and repeating the above steps.

Where there is to be a third layer, the mold and elastomer coatings are subsequently immersed in the third elastomer solution for a period of time from about 1 second to about 240 seconds so as to form the third layer over the first two layers or portions thereof. The mold and elastomer coatings can then be placed in an oven with air temperatures ranging about 190° to about 700° F. for a period from about 1 second to about 5 minutes to complete the cure and the chemical bond between the layers. The mold and the elastomer coatings can then be submerged in a room temperature water bath after being removed from the curing oven.

The elastomers used in the process of the present invention include polyvinyl chloride plastisols, with latex-based elastomer solutions being particularly suitable for this purpose. Any suitable durometer may be used, with durometers in the range from about 40 to about 120 being typical.

A pattern (e.g., a tread pattern) can be pressed/imprinted into a layer on the mold after the elastomer has been at least partially cured and while the material is still soft.

A fabric layer can be placed over the mold and at least a portion of the fabric can be immersed in the elastomer solution together with the mold so that the elastomer layer forms over the fabric layer, thereby forming a lining in the article. The fabric and elastomer are placed in an oven at an elevated temperature to complete the curing process.

The invention also provides a process for manufacturing a chemically-bonded, multi-characteristic, flat-molded elastomer article, such as an outsole for an athletic shoe, for example. The process comprises the sequential steps of: (a) providing a mold having at least one cavity formed in a face thereof which has a shape corresponding to at least a portion of the article, (b) heating the mold to an elevated temperature, preferably in an infrared oven, (c) dispensing a first liquid, latex-based elastomer solution having a first material characteristic into the cavity, up to about the lip thereof, (d) heating the mold and the first elastomer solution to an elevated temperature so as to at least partially cure the first elastomer solution in the mold, (e) dispensing a second liquid, latex-based elastomer solution having a second material characteristic into the mold, so that a layer of the second, elastomer solution extends over at least a portion of the first elastomer material in the cavity therein, (f) fully curing the layers of the first and second elastomer materials so that a permanent chemical bond forms at the interface of the two layers, and (g) removing the article from the mold.

There may be a plurality of cavities in the face of the flat mold which are separated by walls or dams in the mold, and each cavity may be filled separately with an elastomer solution having a different material characteristic. The layer of second elastomer material is then dispensed over the top of two or more of these cavities so as to bond all of the elastomeric layers together in a single, seamless article.

In one embodiment, the flat mold may be pre-heated in an infrared oven to a temperature between about room temperature and about 300° F. After the first liquid elastomer has been dispensed into the cavity, the mold may be placed in an oven with an air temperature ranging from about 190° to 700° F., for a period of between 1 second and 5 minutes, until the first elastomer is at least partially cured. After the second elastomer is dispensed into the mold on top of the partially cured first elastomer, the mold may be placed in the oven at the above temperatures for sufficient time to allow the new layer to at least partially cure over the first elastomer material.

Where there is to be a third elastomeric layer, the first two layers are only partially cured and then the third layer may be dispensed on top of the other elastomers and placed in the oven at the aforementioned temperature range for sufficient time to enable all layers to completely cure and bond.

The layers bonded together can be comprised of both open and close cell formulations, with the open cell formulations providing the cushioning which is sought in particular areas or sections of footwear.

DETAILED DESCRIPTION

Figure 4:
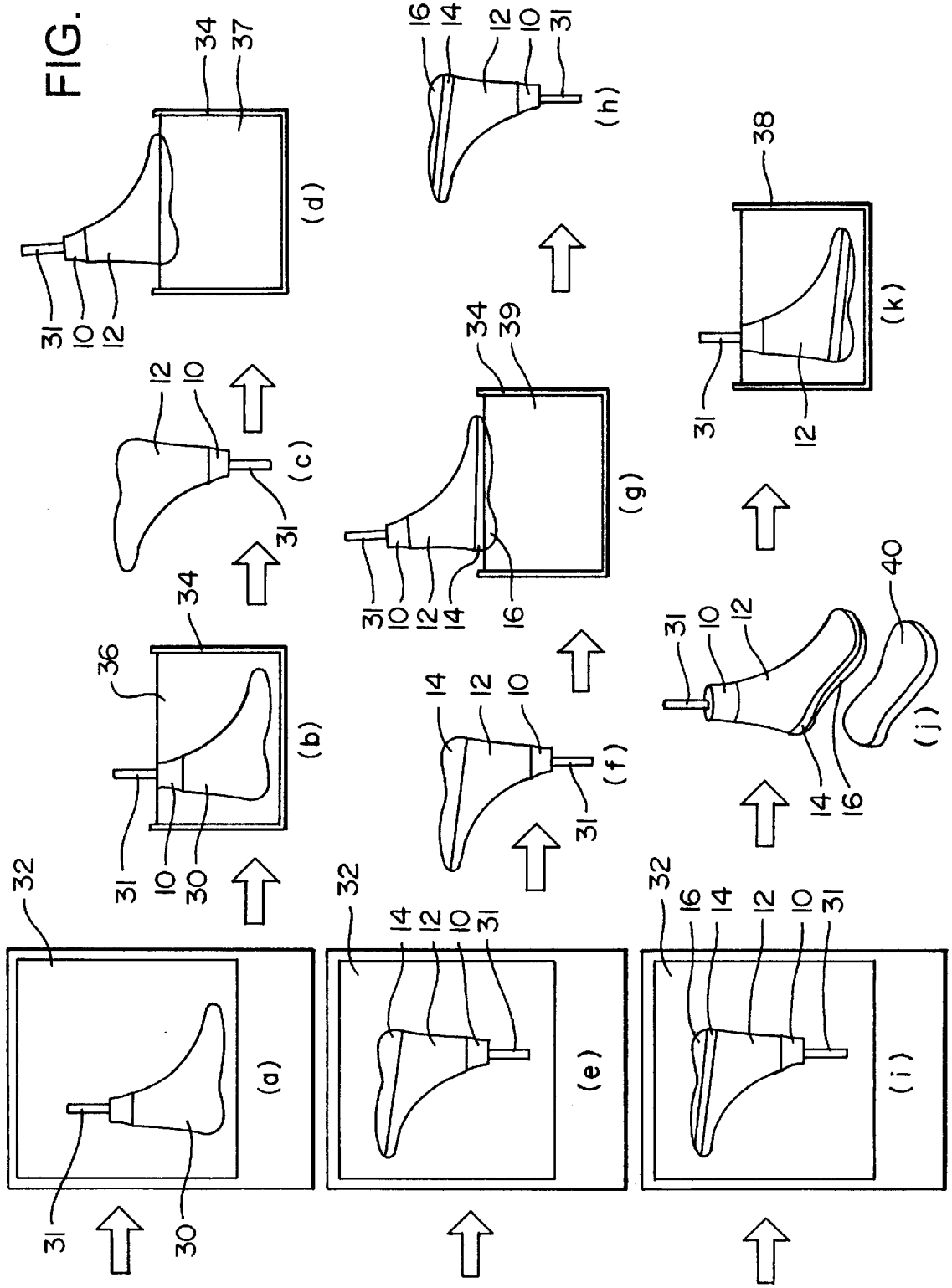
FIG. 4 is a schematic view illustrating the sequential steps in the process of forming a boot or other article in accordance with the present invention by dipping a heated mold in a series of elastomer solutions, with partial curing of the elastomers occurring between certain of the immersion phases.
Figure 5:
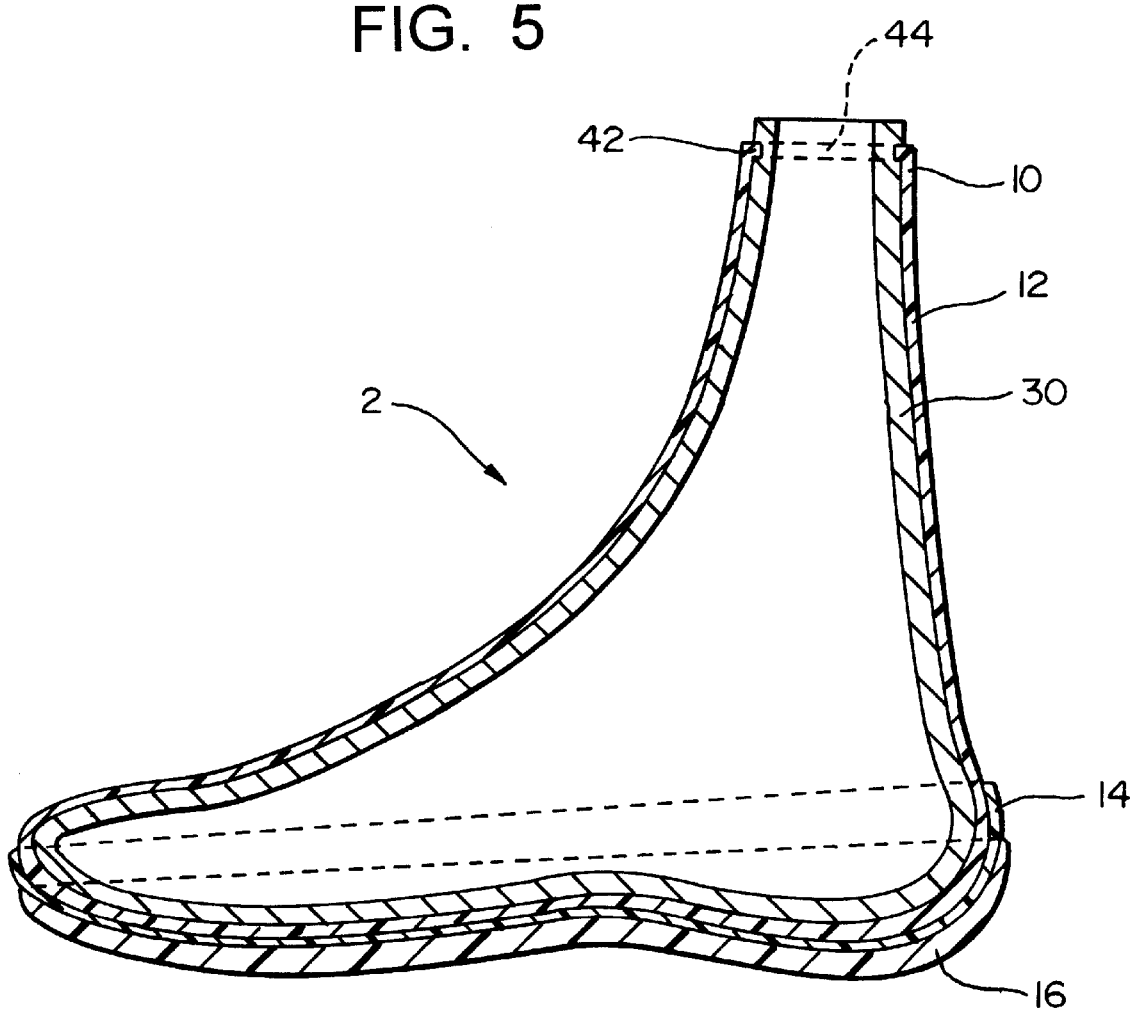
FIG. 5 is an elevational view of a cross-section taken vertically through the mold of FIG. 3, showing this with an exemplary elastomeric watersports boot being formed on the exterior thereof, and with elastomer upper and lower soles being molded onto the bottom of the boot.
Figure 6:
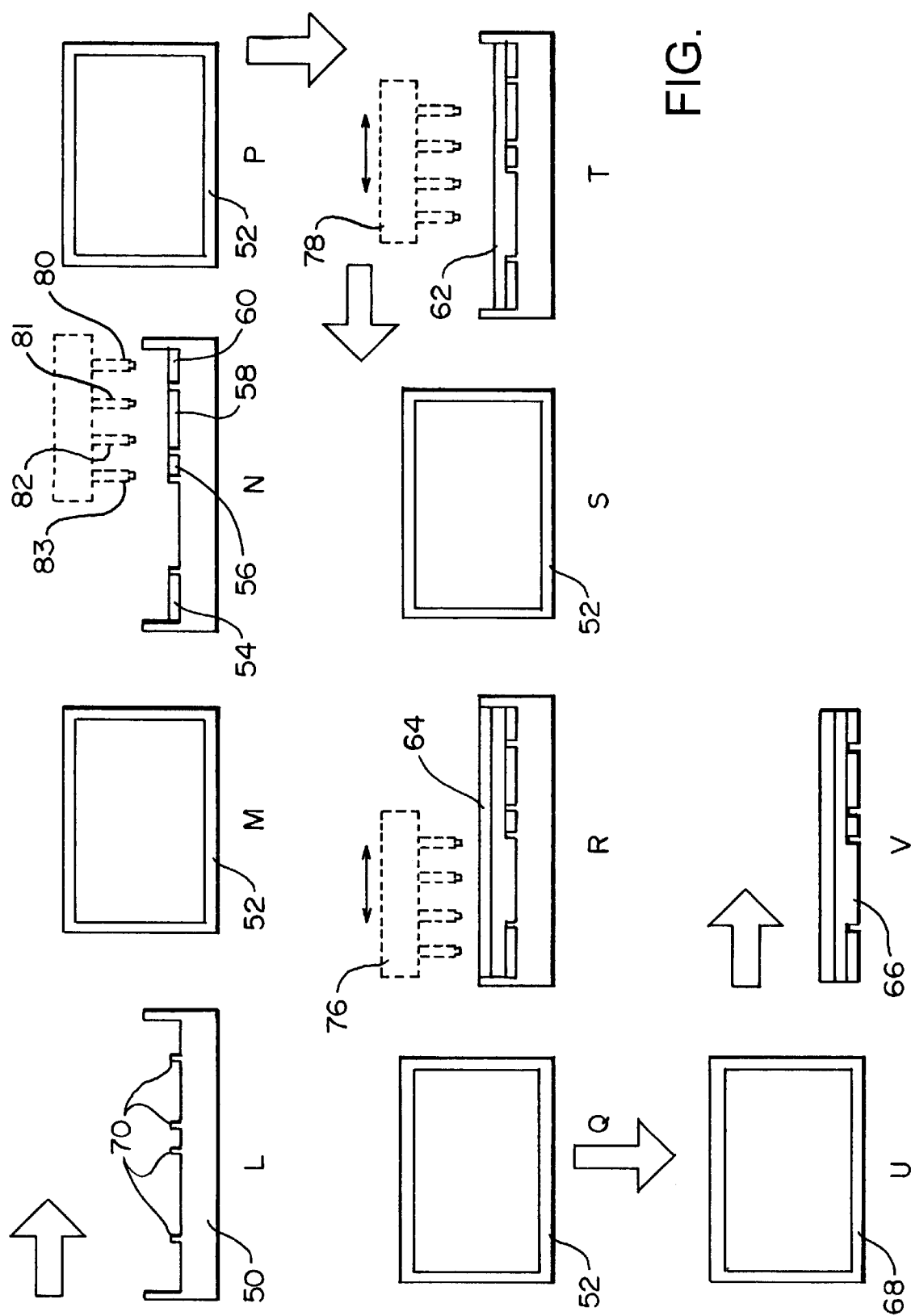
FIG. 6 is a schematic view somewhat similar to FIG. 4, illustrating the sequential steps in the process of forming flat-molded articles in accordance with the present invention, by dispensing liquid elastomers into walled cavities in an open-faced mold, with partial curing of the elastomers taking place between certain of the dispensing phases.
Figure 8:
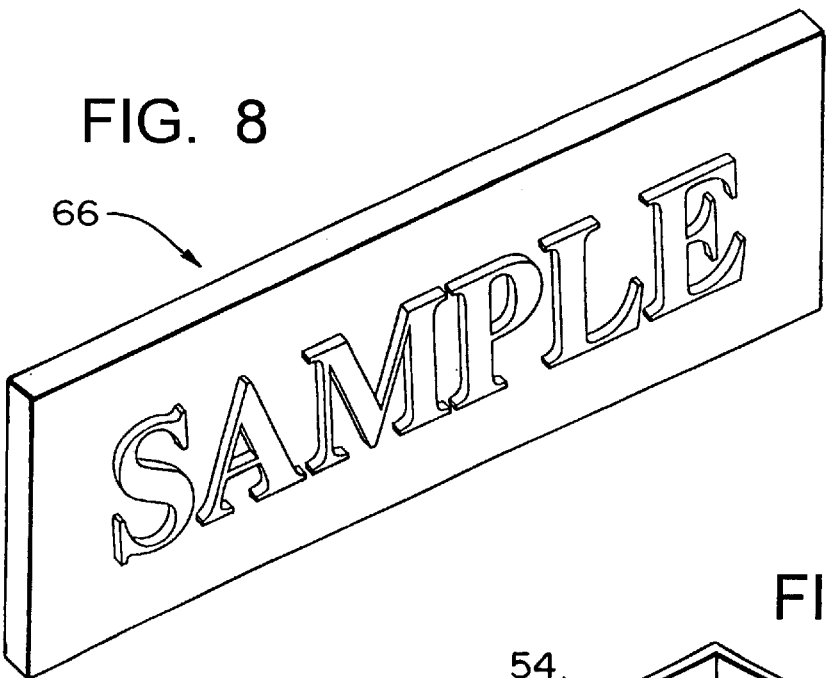
FIG. 8 is a perspective view illustrating an exemplary multi-characteristic, one-piece, seamless article manufactured in the mold which is shown in FIG. 7, using the process which is shown in FIG. 6.
Figure 7:
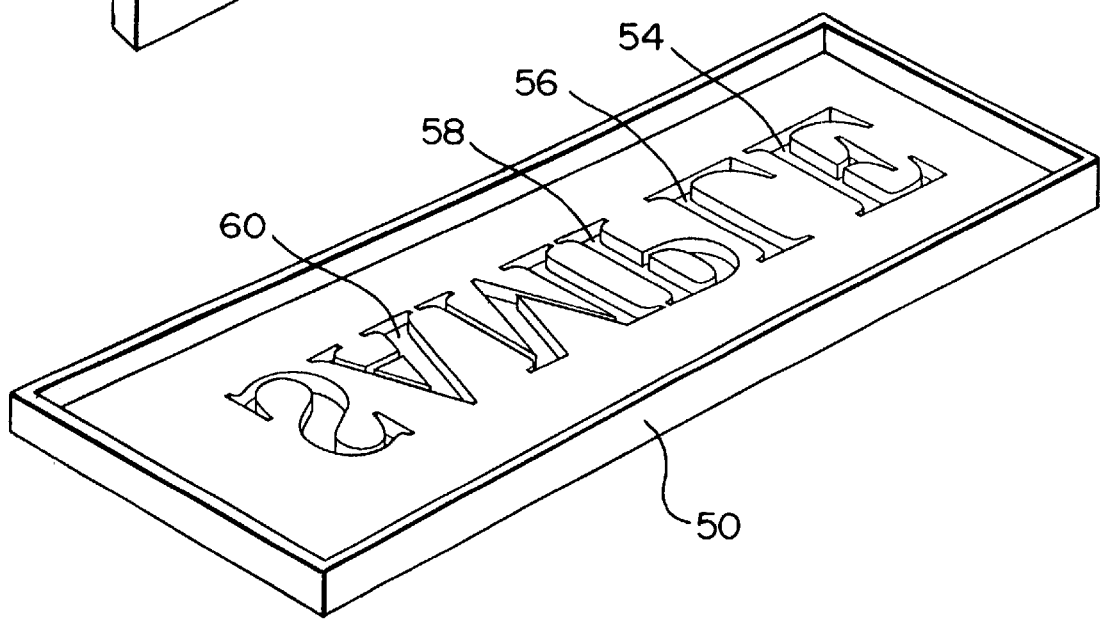
FIG. 7 is a perspective view illustrating an exemplary multi-cavity mold with walls or dams which separate the cavities for the different liquid elastomers, but which terminate below the upper lip of the mold in order to leave room for one or more additional layers of elastomer solution to be poured over the top of the layers in the separate cavities.

FIGS. 1–8 illustrate specific embodiments of the invention which include both immersion molding (FIGS. 1–5) and flat molding (FIGS. 6–8). In both cases the basic process steps are similar, the main difference being that in immersion molding the different layers of elastomeric material are built up on the exterior of a male mold which is dipped into the solution, whereas in flat molding the elastomer materials are dispensed into the interior of a female mold.

a. Immersion Molding i. Process Steps

The immersion molding embodiment of the present invention will be described herein with reference to an exemplary boot for use in aquatic sports, such as those which have been described above, although it will be understood that the process steps are equally applicable to the manufacture of other types of molded elastomeric products having configurations which suit them for formation over a male mold, such as "rubber" gloves, to give just one example.

One of the several advantages of forming an immersion-molded boot or similar product in accordance with the present invention is that this eliminates the need for seams to join separately molded pieces of the article, thereby overcoming the disadvantages which exhibited by conventional products having seams. For example, the present invention permits construction of an elastomeric, one-piece boot which conforms snugly to the foot yet which does not require a zipper to do so; moreover, the boot can be molded so that in certain areas (as around the ankle, for example) the elastomeric material is more elastic or "stretchy" for ease of use, while in other areas (as in the sole) the material is tougher and has a higher durometer for superior wear and penetration resistance. Also, a liner such as a neoprene coated fabric may be optionally included.

Immersion molding of the boot or other product can be carried out in a batch or continuous process by staged dips of a heated mold to regulated depths into heated elastomer-reducer solutions of the same or different formulations, with intermediate, partial cure states (the term "partial cure" as used herein means that a skin coat is formed on top of the elastomer to a degree that the elastomer will not run or mix with a new layer of liquid elastomer deposited on the first) to provide chemically-bonded layers having different specified properties.

Figure 1:
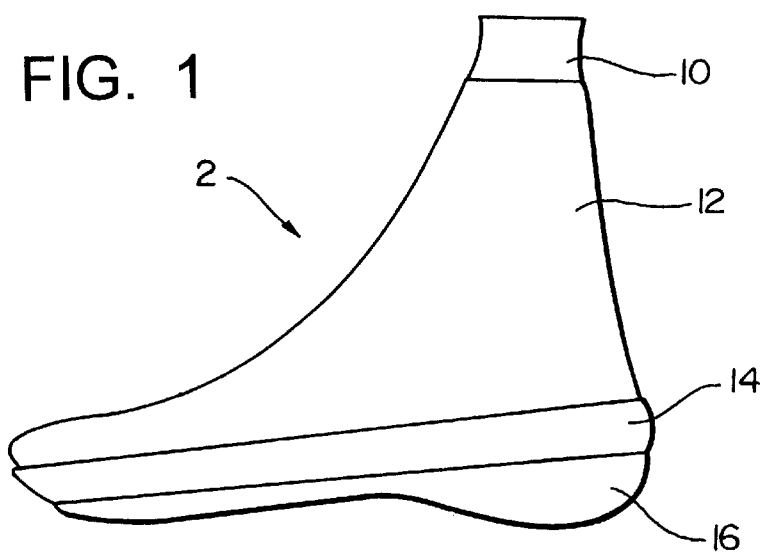
FIG. 1 is an elevational view of an exemplary high-top watersports boot formed in accordance with the process of the present invention.
Figure 2:
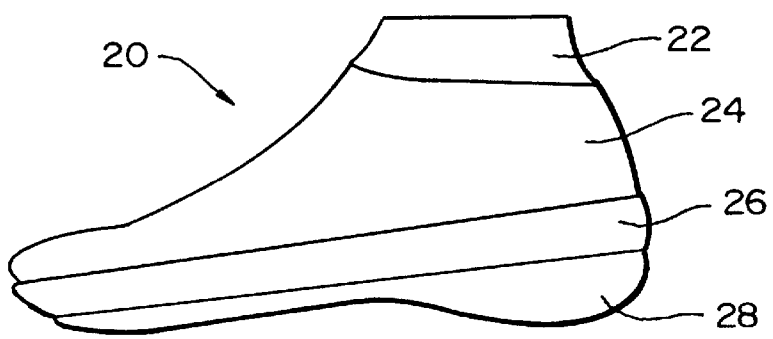
FIG. 2 is an elevational view of an alternative, low-top watersports shoe formed in accordance with the process of the present invention.
Figure 3:
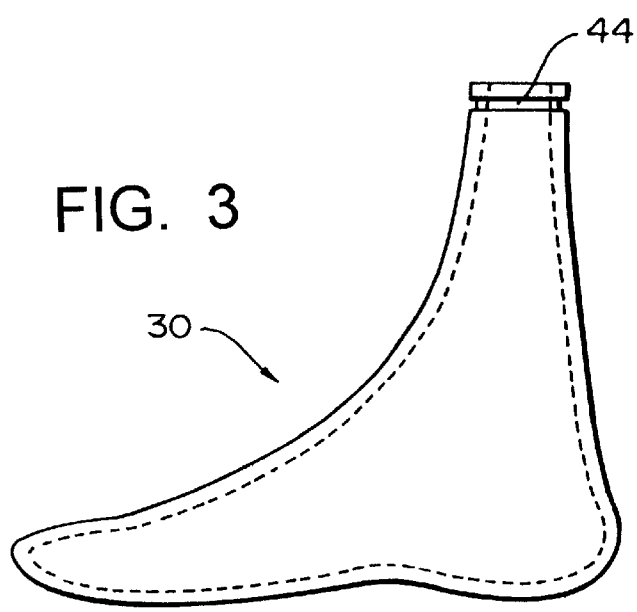
FIG. 3 is an elevational view of a mold which can be used in the process of the present invention to form the footwear of FIGS. 1–2.

Accordingly, as can be seen in FIG. 1, an exemplary high top boot 2 constructed in accordance with the present invention includes a throat portion 10, a body portion 12, an uppersole portion 14, and a lower, walking sole portion 16, all of which are bonded together in the course of the molding process. FIG. 2 illustrates a side view of a similar shoe-type boot 20 having a somewhat lower throat portion 22, body portion 24, upper sole portion 26, and walking sole portion 28. FIG. 3, in turn, shows a sectional view of the hollow metal mold 30 which is used to form the inner part of both the boot in FIG. 1 and the boot in FIG. 2. The contour, support and thickness of the throat, body, and sole portions are created according to the depth and time the mold is dipped into the elastomer solution.

The immersion molding process is illustrated schematically in FIG. 4 in relation to the high top boot 2 of FIG. 1. As can be seen, the mold 30, which is preferably a hollow metal (e.g., aluminum) body coated with TEFLON (polytetrafluorethylene) or a similar material, is heated in an infrared oven 32 until the required temperature is reached (typically, between 1 and 20 minutes).

The construction of the mold, the Teflon™ (or similar) coating, and the use of an infrared oven all play a part in enabling the process of the present invention to achieve a very short cycle time during which the elastomer materials are cured, as compared with conventional processes. In the case of conventional molding process using elastomer plastisols, the cure times typical range from 15–20 minutes and upward. It has been found, however, that such long cure times cause certain of the oils in the plastisol material to "burn off", resulting in color deterioration, durometer variations, and other problems in the finished product. The present invention avoids these problems by keeping cure cycle times down in the range of about 3 minutes. In particular, it has been found that by using a very dull (e.g., sandblasted) exterior finish on aluminum molds (as opposed to a high "shine" finish), the infrared energy doesn't reflect off the molds, and moreover the TEFLON (polytetrafluorethylene) or equivalent finish enables the mold to first absorb heat very quickly and to then cool down very quickly so as to rapidly heat quench into the material.

The heated mold is submerged by holding rod 31 in a tank 34 of specified resilient elastomer solution 36 (which may be either undiluted or thinned as desired with a thinner or reducer) up to the top of the throat portion 10 for a specified length of time (typically, in the range from 1 to 180 seconds), so that the elastomer solution gels on the outside of the mold to form a coating having a predetermined thickness. The mold 30, together with the layer forming the throat portion 10 and body portion 12, is then removed from the dip, inverted, and the elastomer layer is allowed to partially cure on the heated mold and/or in oven 32 (typically at an air temperature ranging from 190° to 700° F. and typically from one second to five minutes). Visible gases, which appear as smoke, are released from the boot during cure. Curing has been completed to a sufficient stage when the smoke has continued for a certain time, which is determined by experience. Satisfactory partial cure times are governed by oven efficiency, formulations, temperatures, and other relevant process parameters.

The mold is then turned back upright and dipped into the second solution 37 (which can have the same or a different formulation from that of the first solution 36), this time up to the top of the upper sole portion and for a further specified period of time (typically, from 1 to 240 seconds), thus creating a contour line between the body portion 12 and the upper sole portion 14 of the boot. The mold 30 is then withdrawn from the elastomer-reducer solution 37, inverted, and placed in oven 32 to partially cure the first and second coatings.

The lower, walking sole portion 16 is then formed by removing the mold 30 from the oven, uprighting the mold, and dipping the mold and into another elastomer formulation 39, up to the top of lower sole portion 16, so as to create a thick, durable, penetration-resistant walking sole for the boot (see process step (g) in FIG. 4). Alternatively, the lower sole portion can be formed in a separate mold (e.g., flat-molded) placed on upper sole 14, and bonded to it by glue and/or heat.

The first elastomer solution 36, second solution 37, and third solution 39 can be different formulations to provide their respective layers with different material characteristics/properties which are suited to their intended purposes. For instance, with respect to the manufacture of the exemplary boot 2, the first solution 36 should provide a soft, resilient elastomer layer which can be readily stretched so that the boot can be pulled on or off a foot with ease. The second solution 37 can be formulated to provide a more rigid, durable coating, for good wear purposes. The third solution 39 can be formulated to provide a coating which stands scuffing and provides traction and long wear. It will be recognized, however, that any suitable combination of formulations can be used. Also, further dipping solutions may be included in the process if desired.

After the respective dippings, the boot and mold 30 are inverted and placed in an oven (typically at an air temperature ranging from 190° to 700° F. and typically from one second to five minutes) until the elastomer layers are completely cured. The boot 2 is then removed from the oven 3 and is left on the mold 30 until it has cooled to room temperature. Cooling can be accelerated by immersing the mold 30 and the boot 2 in a water tank 38, as seen in FIG. 4, step (k). Once peeled from the mold 30, the boot 2 is allowed to cure for a further twenty-four hours at room temperature to ensure that final curing and full strength are achieved.

FIG. 4, step (j), illustrates an optional intermediate step that can be conducted to form a grid or tread pattern, with or without a logo, on the sole portion 16 of the boot. A female mold 40, which can have formed thereon in inverse pattern a traction, tread or grid pattern, with or without a logo, is pressed against the bottom of sole portion while it is still soft so as to imprint the pattern into sole portion before dipping the boot in the water tank 28.

FIG. 5 illustrates a side section view of boot 2 formed on the mold 30. FIG. 5 illustrates readily the different thicknesses of the various portions, for instance, the lower sole portion 16 is thicker than the upper sole portion 14. The body portion 12 is thinner yet, and is formed of a stretchable, resilient grade of elastomer to permit the boot to be pulled on or off the foot. The upper sole portion is formed of a somewhat higher durometer, more durable material to provide cushioning support for the foot of the wearer, and may also be formed in a contrasting color for added aesthetic appeal. The lower sole portion 16, in turn, is formed of a coating which provides traction and wear resistance. FIG. 5 also illustrates a rim portion 42 which can be formed at the top of the throat portion 10, by means of a corresponding groove 44 formed in mold 30: the rim portion serves to retard ripping of the throat portion when this is pulled over a foot.

ii. Equipment and Materials

As was noted above, a male mold for use in a continuous, staged dipping process in accordance with the present invention is suitably formed of a heat conductive metal material, with cast aluminum being especially suitable for this purpose. The mold can be formed to have the shape of the finished article according to conventional casting/forging technology, using plaster of paris or sandcast molds, for example.

Hollow metal molds are generally preferable to solid-core molds, since solid metal mandrels shaped in the form of the article generally possess excessive heat capacity, and as a result these hold the heat for too long a time for dipping and partial curing to be conducted efficiently and with short enough cycle times; use of lower temperatures with solid molds tends to prolong the setting time of the article beyond acceptable limits, and again heat transfer and curing times tend to be excessive.

Hollow metal molds have been found generally superior to ceramic molds as well, since the latter tend to be too porous to provide satisfactory results: Gases tend to be absorbed and contained in the ceramic mold and then, after the mold has dipped in elastomer-reducer solution, these gases escape into the elastomer layer forming undesirable pores in the coating. Moreover, the heat in a ceramic mold does not transfer satisfactorily and, as a consequence, a partially cured boot was not readily obtained.

Suitable liquid elastomer plastisol materials for use in each of the example processes described herein are latex-based solutions available from QCM Company (930 S. Central, Kent, Wash. 98032, U.S.A.), with suitable examples including QCM's batch nos. P7002, P6721, P6957, P8109, P6940, P5963, P6027, P5608, P5957, P5029. The process is not, however, restricted to these specific formulations. The mixture is let stand for a period of 24 hours prior to use, to permit any undesirable entrained air bubbles to escape from the solution.

The infrared oven used in the below example is preferably from 6 cubic feet to 1800 cubic feet and typically maintains an air temperature of between 190° and 700° F.

iii. Example Processes—Immersion Molding

A number of alternative processes and steps can be utilized according to the principles of the present invention in order to manufacture a given article which has various desired custom features. The examples are illustrative in order to demonstrate certain materials and parameters that can be used with the immersion molding process described above, and are not exhaustive. For example, it will be recognized that the elastomer dip times and the cure times are variable according to the elastomer-reducer formulation that is used, the type of heat capacity of the mold that is used, and the type and thickness of the molded article that is to be formed, and other process parameters.

EXAMPLE PROCESS #1

For the formation of an exemplary aqua boot such as that described above, a hollow aluminum mold of about ¼ inch (1 cm) wall thickness in the shape of a human foot has been found to work well under the following conditions.

The mold is heated in an infrared oven to between 190° and 700° F. for from 1 to 20 minutes. The mold is then dipped in an upright manner into the first elastomer solution, such as QCM No. 6957, which is tailored to provide a tough, resilient waterproof article having sufficient elasticity to be pulled on and off over a user's foot. In preliminary experimentation, utilizing pure elastomers without reducers, finished articles were found to be impractical because they had little or no stretch. The elastomer solution according to specifications can be held in a bath tank at a temperature ranging from about 60° F. to about 120° F.

Initially, the heated mold is dipped into the elastomer solution (P6957) for typically between 1 and 180 seconds during which time the solution gels and accumulates in a layer against the heated exterior surface of the mold; since the rate of accumulation is proportional to the time of immersion, the immersion time and mold temperature are selected to produce a predetermined thickness for that particular layer or area of the article. The mold and elastomer coating are then raised or lifted out of the solution, inverted, and allowed to partially cure due to the heat contained in the mold. The mold is then moved to the oven and curing continues until the desired degree of partial cure is achieved.

Then, if a thicker section or a section with different material characteristics (e.g., a different durometer or color) is required, the mold together with the first coating is dipped partially or completely into a second solution, where it remains for a period of time sufficient for a coating of the second elastomer to adhere to the first layer, typically between 1 and 240 seconds depending on the desired thickness. The mold with the second elastomer solution coated thereon is then removed from the second solution, inverted, and held in the oven with an air temperature between 190° and 700° F. for a period of time sufficient to at least partially cure the outer layer of elastomer. The two-layered article may subsequently be dipped into a third elastomer solution should yet another characteristic be required in the article. The mold, which now has two layers of different elastomers adhered to at least a portion of it, will remain in the third elastomer solution for a period of time sufficient for a coating of the third elastomer to adhere to the first and second elastomers or portions thereof, typically between 1 second and 5 minutes.

The depth that the mold is dipped to is governed by the design of the article, as is the portion of the mold which is dipped in each phase. For example, the final elastomer solution may be an open cell material and may be dipped long enough to provide a comparatively thick coating. As was noted above, the thickness is determined by the length of time in the dip and the heat of the mold. If required, the article can be taken during some part of its curing process, while the elastomer is still soft, and placed against a mold to imprint the elastomer with some suitable pattern; for example, the final layer, which forms the bottom of the boot in this example, can be imprinted with a textured surface pattern for enhanced traction.

Following curing, the mold and the elastomer article molded thereon are removed from the oven and dipped in a cooling tank containing water preferably held at between about 50° F. and about 90° F., to cool the mold and formed article; the mold and the elastomer article are cooled quickly and efficiently in this manner. The mold and the elastomer article are then removed from the cooling tank and the article is peeled off the mold.

Optionally, another section can be formed separately and bonded to the main article, for example by placing a separate flat molded elastomer article (which may be constructed as described below) against the elastomer covered mold before the outer elastomer layer theron is fully cured. Together these are placed in the final cure oven where they will bond. Also optionally, a section can be formed separately and bonded to the main article by placing the separate flat molded article on the elastomer covered mold after the elastomer has been removed from the final cure oven but while it is still hot and before it has been shocked by water.

EXAMPLE PROCESS #2

The hollow mold described in Example Process #1 above is first fitted with a sock formed of neoprene coated nylon fabric which is pulled over the mold. The mold and fabric are then heated to between about 250° F. and about 450° F. for a period of about 30 seconds to about 18 minutes.

The mold and the neoprene and nylon fabric are then dipped into the elastomer bath up to a specified height for a period of time sufficient to allow the elastomer to adhere to the fabric. Three dips of typically between 1 and 180 seconds can be used, the first to provide an initial sheer coating, the second to provide an intermediate layer, and the third to provide an outer layer (all of the same elastomer formulation), so that the overall desired thickness of the coating can be achieved. After the final dip, the mold and the elastomer coated fabric are inverted and placed in an oven with an air temperature of between about 190° and about 700° F. for a period of between about 1–5 minutes to ensure bonding of the various layers. Inversion prevents projecting runs and drips from forming on the bottom of the article.

After the first layer of elastomer has at least partially cured to form the upper layer of the article, the mold, fabric and upper layer are dipped into a second elastomer solution for a period of time sufficient to allow the second formulation to adhere to the first or a portion thereof, typically between about 1 second and about 6 minutes. The depth to which the mold is dipped is governed by the design of the article.

After the dip into the second elastomer formulation, the mold, fabric and layered elastomers are inverted and placed in an oven with an air temperature typically between about 190° and about 700° F. for a period of time, typically between about 1 second and about 5 minutes. The depth that the mold is dipped to is again governed by the design of the article. The final elastomer solution may be dipped into up to three times (or more, in some embodiments), with intervening cure periods in order to achieve the desired thickness. The mold, fabric and layers of elastomers are then placed in an oven for a period of time sufficient to allow all layers of elastomers to completely cure, typically from about 10 seconds to about 8 minutes.

If required, the article can be taken during some part of its curing process, while the elastomer is still soft, and placed against a mold so as to may imprint the elastomer with some suitable pattern.

By using this process, it is possible to form an article having a neoprene and nylon fabric inner liner and one or more outer coatings of cured elastomer, according to graded thicknesses, as illustrated in FIGS. 1 and 2. Alternatively, by complete immersion(s) the neoprene and nylon fabric can be coated entirely with elastomer.

b. Flat Molding

Flat goods with areas of distinctly different characteristics can be achieved by creating ferrous or non-ferrous open-face molds, typically milled or cast/forged to a typical depth of between 1 mm and 50 mm to form one or more distinct cavities. For the reasons discussed above, the mold is most preferably formed of matt-finish aluminum coated with TEFLON (polytetrafluorethylene).

The mold can be in the shape of any generally flat-surfaced article, such as an athletic shoe sole or logo, for example. Where the product is to have one or more features (e.g., raised letters in the example which is shown) which are to be bonded to a common base or "backing" layer, the mold has one or more walls or dams which separate the cavities so that the different liquid elastomers for the various features do not run together. Depending on the design of the article, these dams may or may not extend all the way to the lip of the mold.

FIG. 6 illustrates schematically a process for producing a flat molded article 66 (FIG. 8) using a TEFLON (polytetrafluorethylene) coated metal female mold 50, heated in an oven 52, (step (m) in FIG. 6) to a temperature range typically between about 60° F. (approximately room temperature) and about 300° F. As with the process described above, the molds are preferably heated in an infrared oven, with an air temperature approximately ranging from about 190° to about 700° F. In the exemplary process which is described below, the infrared ovens are shaped as a tube and are preferably from about 6 to about 24 inches high, about 1 to about 8 feet wide, and about 6 to about 100 feet long.

The heated mold travels from the oven to under a liquid elastomer dispenser 74, (step (n) in FIG. 6) which dispenses elastomers 80, 81, 82, 83 having different characteristics (e.g., different densities, durometers and/or colours) into mold cavities 54, 56, 58, 60, up to the level of the dams 70; as previously noted, durometers of the cured elastomer materials typically range from about 40 to about 120, and suitable types of elastomer formulations are described above. The mold then moves to oven 52, (step (p) FIG. 6) where the elastomers are partly cured.

After partial curing, the mold next travels under another liquid elastomer dispenser 78, (step (t) in FIG. 6) where an elastomer solution 62 is dispensed from all of the nozzles so that this flows over the top of the partially cured elastomers 80, 81, 82, and 83 in the separate mold cavities. This liquid elastomer 62 forms a continuous layer which bonds to and joins the other elastomer sections (80,81,82,83) and may or may not fill the mold 50 all the way to its upper lip. The elastomer used to fill the mold above the dams forms a chemical bond with each of the different elastomer formulations which were initially laid down within the cavities, and has the capacity to bond with both open or closed cell elastomers.

The mold and elastomers are then moved once again to oven 52, (step (s) in FIG. 6) where the elastomers are at least partially cured (should only two layers be required for the finished article, then step (s) will be complete cure). The third layer of the article is then formed by dispensing another elastomer solution 64 (step (r) in FIG. 6), which may or may not be an open cell formulation (open cell formulations provide the cushioning which is often sought in footwear), from dispenser 76. Dispenser 76 dispenses formulation 64 out of as many nozzles as are required. The elastomer filled mold is then moved to oven 52 (step (q) FIG. 6), where all layers of elastomer are fully cured and bonded.

As the final step in the process, the mold and cured elastomer article are moved through an air cooling chamber 68, (step (u) in FIG. 6) before the finished article 66 is removed from the mold (step (v) in FIG. 6).

The disadvantages inherent in prior art injection molding processes, which require a separate mold for each size and width of the article (e.g., for each size and width of shoe sole) can thus be overcome in the present invention, by forming the upper or "backing" layer or layers of an elastomer solution which exhibits a high degree of elasticity. The elasticity will allow one mold size to fit more than one size and width, since the elastic backing layer(s) will "stretch" as necessary, while the individual features/areas on the bottom of the sole or other article can be formed with a higher durometer and less elasticity to provide the product with satisfactory performance and wear characteristics.

Furthermore, the problems with delamination experienced in prior art processes are not possible with this process, which allows partially cured liquid elastomers to chemically bond into one, inseparable unit. The process is also cost efficient, since it can be employed in an automated process with high-volume hourly output.

As will be apparent to those skilled in the art, in light of the foregoing disclosure, many alterations and modification are possible in the practice of this invention without departing from the spirit or scope thereof. Accordingly, the scope of the invention is to be construed in accordance with the substance defined by the following claims.

What is claimed is:

1. A method for forming a one-piece elastomeric article, said method comprising the steps of:
   providing a mold member having a mold area, said mold member being formed of thin, heat-conductive metal material having a low heat capacity in said mold area, said mold area further having a dull matte finish for enhanced absorption of infrared energy and a coating of polytetrafluorethylene formed over said matte finish for accelerating thermal absorption therefrom;
   heating said mold member to a predetermined elevated temperature by placing said mold member in an infrared oven so that infrared energy is absorbed by said mold area having said dull matte finish;
   applying a first liquid elastomer to said heated mold member so that said mold area is rapidly heat-quenched by transfer of heat into said first liquid elastomer through said matte finish and said polytetrafluoroethylene coating so that said liquid elastomer gels on said mold member to form a first elastomer layer having a first material characteristic;
   partially curing said first elastomer layer on said mold member so that a thin skin layer forms over an outer surface of said layer;
   applying a second liquid elastomer to said mold member over at least a portion of said first elastomer layer thereon, so that said second liquid elastomer gels to form a second elastomer layer on said first elastomer layer while said skin coat prevents intermixing of said first and second liquid elastomers; and
   at least partially curing said second elastomer layer on said first elastomer layer so as to form a permanent chemical bond which prevents delamination of said first and second layers;
   whereby said thin, heat conductive metal material, said dull matte finish and said polytetrafluoroethylene coating cooperate to provide rapid heating of said mold area by said infrared oven, and rapid quenching of said mold area by said first elastomer layer so as to avoid degradation of said material characteristic thereof.

2. The method of claim 1, further comprising the steps of:
   selecting said second liquid elastomer to form a second elastomer layer having a second material characteristic which differs from said material characteristic of said first elastomer layer.

3. The method of claim 2, wherein said first material characteristic is a first durometer and said second material characteristic is a second durometer which is different from said first durometer.

4. The method of claim 2, wherein said first material characteristic is a first distinguishable color and said second material characteristic is a second distinguishable color which is different from said first color.

5. The method of claim 2, wherein the step of applying said first liquid elastomer to said mold member comprises:
   at least partially immersing said mold member into said first liquid elastomer so that said first elastomer layer forms on at least a portion of an outer surface of said mold member.

6. The method of claim 5, wherein the step of applying said second liquid elastomer to said mold member comprises:
   at least partially immersing said mold member with said first elastomer layer thereon into said second liquid elastomer so that said second elastomer layer forms on an outer surface of at least a portion of said first elastomer layer.

7. The method of claim 2, wherein the step of applying said first liquid elastomer to said mold comprises:
   depositing said first liquid elastomer in said mold member so as to at least partially fill at least one cavity therein, so that said first elastomer layer forms in at least a portion of said cavity.

8. The method of claim 7, wherein the step of applying said second liquid elastomer to said mold member comprises:
   depositing said second liquid elastomer in said mold member over at least a portion of said first elastomer layer in said cavity, so that said second elastomer layer forms on an upper surface of at least a portion of said first elastomer layer.

9. The method of claim 8, further comprising the step of:
   forming said mold member to have a primary receptacle area and at least one dam portion which divides a lower portion of said primary receptacle area into a plurality of separate cavities for receiving a plurality of liquid elastomers which are selected to form respective elastomer layers having different material characteristics.

10. The method of claim 9, wherein the step of depositing said second liquid elastomer in said mold member comprises:
    depositing said second liquid elastomer layer in said primary receptacle area so that said second liquid elastomer flows over said plurality of separate cavities, so that said second elastomer layer forms a backing layer which joins said elastomer layers in said cavities.

11. The method of claim 2, further comprising the step of:
    selecting said first and second liquid elastomers from the group consisting of polyvinyl chloride plastisols.

12. The method of claim 2, further comprising the step of:
    selecting said first and second liquid elastomers from the group consisting of latex-based plastisols.

13. The method of claim 12, wherein the step of heating said mold member to a predetermined temperature comprises:
    heating said mold member to a predetermined temperature in the range from about 60° F. to about 450° F.

14. The method of claim 13, wherein the step of heating said mold member to a predetermined temperature comprises:
    heating said mold member to a temperature of about 300° F.

15. The method of claim 1, wherein said conductive metal material is an aluminum alloy material.

16. The method of claim 15, wherein said matte finish is a sandblasted finish formed on said aluminum alloy material.

17. The method of claim 16, wherein said first liquid elastomer is a liquid latex-based plastisol.

18. The method of claim 17, wherein said aluminum alloy material in said mold area has a thickness of about ¼ inch.

19. A method for forming a one-piece elastomeric article having elastomer layers of different colors, said method comprising the steps of:

providing a mold member having a mold area, said mold member being formed of thin aluminum alloy material having a low heat capacity in said mold area, said mold area further having a sand-blasted matte finish for enhanced absorption of infrared energy and a coating of polytetrafluoroethylene formed over said matte finish for accelerating thermal absorption therefrom;

heating said mold member to a predetermined temperature by placing said mold member in an infrared oven so that infrared energy is absorbed by said mold area having said matte finish;

applying a first liquid latex-based plastisol to said heated mold member so that said mold area is rapidly heat-quenched by transfer of heat into said first liquid elastomer through said matte finish and said polytetrafluoroethylene coating so that said liquid elastomer gels on said mold member form a first elastomer layer having a first color;

partially curing said first elastomer layer on said mold member so that a thin skin layer forms over an outer surface of said first elastomer layer;

applying a second liquid latex based plastisol to said mold member over at least a portion of said first elastomer layer thereon, so that said second liquid latex-based plastisol gels to form a second elastomer layer having a second color while said skin coat prevents intermixing of said first and second liquid plastisols and;

at least partially curing said second elastomer layer so as to form a permanent chemical bond which prevents delamination of said first and second layers;

whereby said thin, heat conductive metal material, said sand-blasted matte finish and said polytetrafluoroethylene coating cooperate to provide rapid heating of said mold area by said infrared oven, and rapid heat-quenching of said mold area by said first elastomer layer so as to avoid degradation of said color thereof.

* * * * *